United States Patent Office 2,838,403
Patented June 10, 1958

2,838,403

PACKAGING OF DEHYDRATED FOODS

George K. Notter, Berkeley, Calif., assignor to the United States of America as represented by the Secretary of Agriculture No Drawing. Application May 6, 1957
Serial No. 657,462

4 Claims. (Cl. 99—171)

(Granted under Title 35, U. S. Code (1952), sec. 266)

A non-exclusive irrevocable, royalty-free license in the invention herein described, for all governmental purposes, throughout the world, with the power to grant sub-licenses for such purposes, is hereby granted to the Government of the United States of America.

This invention relates to the packaging of dehydrated foods. A principal object of the invention is the provision of procedures for packaging dehydrated foods with a desiccant under such conditions that removal of residual moisture from the food is enhanced and contact of the food with oxygen is minimized whereby to preserve the food in better condition for longer periods of time. Further objects and advantages of the invention will be obvious from the following description.

It is well known in the art that it is often advantageous to package certain materials together with a desiccant so that during storage the material will not undergo deleterious changes. For example, dehydrated food products such as dehydrated fruit juices are often packaged in an hermetically sealed container together with a paper packet containing a desiccant such as calcium oxide. When the resulting package is stored, residual moisture present in the food is absorbed by the desiccant and as a result the storage stability of the food is improved and caking thereof cannot take place.

In accordance with this invention, superior results are obtained by replacing the air normally in the containers with carbon dioxide. This procedure yields several benefits, as follows: In the first place, replacement of the air by carbon dioxide results in effective elimination of oxygen with the result that the possibility of oxidative damage to the packaged food is minimized. Secondly, most of the carbon dioxide introduced into the container is absorbed by the desiccant whereby the total pressure in the container is reduced to a subatmospheric level. This has the benefit that residual moisture present in the food is more readily transferred to the desiccant. That is, reduction in total pressure by removal of $CO_2$ increases the relative vapor pressure of the residual moisture in the food so that the rate of diffusion of moisture from the food to the desiccant is accelerated. This of course means that the food is stabilized more rapidly and hence its flavor and color are more effectively preserved. Moreover, the food is less likely to cake in the can if it is subjected to an unusually high temperature.

Packaging in accordance with the invention can be accomplished by a variety of techniques. A preferred mode of operation is as follows: In the bottom of a can is placed a quantity of solid carbon dioxide ("Dry Ice"). The dehydrated food and the packet containing the desiccant are introduced into the can. The lid is placed on top of the can (without sealing) and the can allowed to stand until the solid carbon dioxide has evaporated, the gaseous carbon dioxide which forms thus displacing the air from the can. The lid is then sealed on the can and the package is complete. It is obvious that the amount of solid carbon dioxide inserted into the can should be sufficient to furnish a volume of gaseous carbon dioxide at least equal to the volume of the can. Usually an excess is used to ensure flushing out of all the air. In any event the can is not sealed until all the solid carbon dioxide has evaporated, to prevent the developing of pressure within the sealed can. Once the solid carbon dioxide has assumed the gaseous state the pressure within the can is atmospheric and will remain so until it is reduced to a subatmospheric pressure by absorption of carbon dioxide by the desiccant. It is of course not essential to employ solid carbon dioxide as the source of this gas. Thus an alternative method is to place the dehydrated food and desiccant packet in the can and introduce gaseous carbon dioxide from a convenient source through a tube which is inserted into the can so that the gas is released at or near the bottom of the can. The gas is allowed to flow long enough to displace the air from the can.

Where the dehydrated food to be packaged is of a porous nature whereby it contains air in its interstices, it is preferable to pretreat the food with gaseous carbon dioxide to flush out this interstitial air before putting the food into the can. This may be accomplished by placing the dehydrated food particles in a vessel provided with a foraminous false bottom. Carbon dioxide gas is then introduced into the base of the vessel so that it flows upwardly through the false bottom and through the mass of dehydrated food particles. Another plan is to allow the dehydrated food particles to flow downwardly through a tower provided with baffles so that the particles cascade from one baffle to the next lower one while being subjected to an upwardly moving current of carbon dioxide. An additional plan involves subjecting the dehydrated food to vacuum to draw air out of the interstices and then break the vacuum by introduction of carbon dioxide whereby the interstices become filled with carbon dioxide. It is obvious that in any of these techniques the carbon dioxide should be dry so that the dehydrated food will not increase in moisture content during the treatment.

Although it is preferred to use a can to package the dehydrated food, it is evident that other types of containers may be used. Any type of container may be employed which is made of gas-impermeable material so that the contents will be isolated from the ambient atmosphere. Thus instead of metallic containers one may employ glass jars or bags made of flexible sheet material such as metallic foils, plastic films, laminates of plastic films and metal foils, and the like. Where a glass jar or similar container is employed, the packaging is accomplished essentially as described above in connection with packaging in a can. Where the container is a bag of flexible sheet material the following technique may be used. The solid carbon dioxide is deposited in the base of the bag and the dehydrated food and desiccant packet inserted in the bag. The mouth of the bag is loosely compressed to permit flushing out of air. After the solid carbon dioxide has evaporated, the bag mouth is sealed by application of conventional sealing techniques such as by the use of adhesives or heat-sealing in the case of plastic films. Instead of using solid carbon dioxide, gaseous carbon dioxide may be introduced into the base of the bag while the mouth is loosely compressed, the mouth being sealed after air in the bag has been flushed. In accordance with this aspect of the invention, the container may be made of gas-impermeable, plastic films of polyvinylidene chloride, rubber hydrochloride, polyethylene terephthalate, or laminates of these with metal foils or other plastic films such as cellophane, cellulose acetate, and the like.

Since in the process of the invention it is intended that the carbon dioxide be absorbed by the desiccant during storage of the sealed container, it is evident that the desiccant be one capable of absorbing carbon dioxide. A particularly preferred desiccant is calcium oxide since it has the ability to irreversibly absorb both water and carbon dioxide. Magnesium oxide likewise has similar properties. One may also employ mixtures of desiccants, for example, a mixture of (1) a carbon dioxide-absorbing agent like calcium or magnesium oxide and (2) an agent which absorbs only water, for example, silica gel, montmorillonite, alumina, calcium sulphate, etc.

It is obvious that in any event, the amount of desiccant employed in each container should be sufficient to absorb all the carbon dioxide and moisture in the system. Usually an excess of the desiccant is used to ensure complete absorption.

As in conventional practice the desiccant is maintained out of physical contact with the food but in moisture-absorptive relation therewith. This is most readily accomplished by placing the desiccant in a packet made of a gas-permeable material such as fabric, paper, and the like.

The dehydrated food which is packaged in accordance with this invention may be any dehydrated food prepared, for example, from solid foods such as meats; cheeses; vegetables such as cabbage, spinch, peas, beans, squash, carrots, beets, celery, chard, corn, onions, rutabagas, potatoes, sweet potatoes, tomatoes, etc.; or fruits such as apples, pears, peaches, apricots, raisins, cherries, cranberries, strawberries, prunes, etc. The dehydrated food may also be a solid product prepared by dehydrating liquid foods such as soups; milk and other lacteal products; eggs; or fruit or vegetable juices derived for instance from oranges, lemons, tangerines, grapefruit, apples, prunes, apricots, cherries, grapes, pineapple, and so forth. The moisture content of the dehydrated food before it is packaged may vary widely depending on the nature of the food, the type of dehydration used, and the degree of stability desired. In many cases the moisture content will be on the order of about 1 to 5%, although it may be as high as 10%.

The invention is further illustrated by the following example.

*Example*

Orange juice powder was packaged in 202 x 314 cans having a capacity of about 200 ml. In each case the following procedure was used: Three grams of granulated solid carbon dioxide was placed in the bottom of the can. A paper packet containing 10 grams of calcium oxide was placed in the center of the can and 75 grams of orange juice powder packed into the can about the desiccant packet. The lid was placed loosely on the can and the system allowed to stand in this way for 8 minutes. The lid was then sealed on the can.

One of the cans was opened soon after sealing and the gaseous contents of the can analyzed. The gas was found to contain 89.5% $CO_2$, 2.4% $O_2$, and 8.05% $N_2$ (by difference).

The remainder of the cans were stored at 77° F. and from time to time a can was removed from storage and subjected to tests to determine the moisture content of the orange juice powder and the pressure of gases in the can. The results are set forth below:

| Sample | Time of storage, months | Moisture content of orange powder, Percent | Gas pressure, mm. Hg |
| --- | --- | --- | --- |
| A | zero | 2.3 | 760. |
| B | 1 | 1.6 | 542. |
| C | 2 | 1.2 | not determined. |
| D | 3 | 1.2 | Do. |
| E | 4 | 0.8 | 150. |

In addition to the above tests, the products stored for 6 months at 77° were formed into reconstituted juices and tasted. The products were hardly indistinguishable in taste from the juice made from the freshly prepared powder. Moreover, the stored products were free-flowing and completely free from caking.

Having thus described my invention, I claim:

1. A method of packaging and preserving a dehydrated food which comprises depositing the dehydrated food and a desiccant capable of absorbing carbon dioxide into a container, introducing carbon dioxide gas into the container to displace the air normally therein, and sealing the container containing an atmosphere of carbon dioxide whereby to minimize oxidative damage to the food and to enhance removal of residual moisture from the food.

2. The method of claim 1 wherein solid carbon dioxide is introduced into the container as a source of carbon dioxide gas.

3. The method of claim 2 wherein the desiccant is calcium oxide.

4. A method of packaging and preserving a dehydrated food of a porous nature normally containing air in its interstices which comprises replacing the interstitial air in the dehydrated food with dry carbon dioxide gas, depositing the so-treated food into a container together with a desiccant capable of irreversibly absorbing carbon dioxide, introducing carbon dioxide gas into the container to flush out the air contained therein and to form an atmosphere of carbon dioxide in the container, and sealing the container containing said atmosphere of carbon dioxide whereby to minimize oxidative damage to the food and to promote removal of residual moisture from the food through reduction in pressure due to absorption of carbon dioxide by the desiccant.

References Cited in the file of this patent

UNITED STATES PATENTS

| | | |
| --- | --- | --- |
| 2,027,429 | Hansen | Jan. 14, 1936 |
| 2,131,181 | Kantor | Sept. 27, 1938 |
| 2,520,878 | Cotton et al. | Aug. 29, 1950 |
| 2,541,441 | Sharp | Feb. 13, 1951 |

OTHER REFERENCES

"Food Technology," March 1954, pages 143 to 149.
"Modern Packaging," January 1955, pages 121 to 124.